(12) United States Patent
Ohsawa et al.

(10) Patent No.: US 11,874,643 B2
(45) Date of Patent: Jan. 16, 2024

(54) DETERMINATION APPARATUS, DETERMINATION SYSTEM, DETERMINATION METHOD, AND RECORDING MEDIUM

(71) Applicants: Shuichi Ohsawa, Kanagawa (JP); Junichi Takami, Kanagawa (JP); Tomoki Umezawa, Kanagawa (JP); Takafumi Horio, Kanagawa (JP)

(72) Inventors: Shuichi Ohsawa, Kanagawa (JP); Junichi Takami, Kanagawa (JP); Tomoki Umezawa, Kanagawa (JP); Takafumi Horio, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 79 days.

(21) Appl. No.: 17/533,450

(22) Filed: Nov. 23, 2021

(65) Prior Publication Data
US 2022/0171365 A1 Jun. 2, 2022

(30) Foreign Application Priority Data
Nov. 30, 2020 (JP) .................... 2020-199131

(51) Int. Cl.
*G05B 19/406* (2006.01)
*G05B 19/4065* (2006.01)
(Continued)

(52) U.S. Cl.
CPC ....... *G05B 19/4065* (2013.01); *G05B 19/408* (2013.01); *G05B 19/4063* (2013.01);
(Continued)

(58) Field of Classification Search
USPC ....................................................... 700/175
See application file for complete search history.

(56) References Cited

U.S. PATENT DOCUMENTS

| | | | |
|---|---|---|---|
| 4,656,868 A * | 4/1987 | Azuma | G05B 19/4065 83/72 |
| 6,701,095 B1 | 3/2004 | Fujimoto et al. | |

(Continued)

FOREIGN PATENT DOCUMENTS

| | | |
|---|---|---|
| CN | 101594279 A | 12/2009 |
| CN | 102387274 A | 3/2012 |

(Continued)

OTHER PUBLICATIONS

Extended Search Report dated Apr. 12, 2022 issued in corresponding European Patent Application No. 21210757.7.
(Continued)

*Primary Examiner* — Hien D Khuu
(74) *Attorney, Agent, or Firm* — Harness, Dickey & Pierce, P.L.C.

(57) ABSTRACT

A determination apparatus includes circuitry to receive operation information corresponding to an action being performed by a machine to be diagnosed and a detection signal of a physical quantity that changes according to the action of the machine; take out, from the detection signal, an operation detection signal indicating that the machine is operating, based on the operation information; extract feature information of the operation detection signal; select, from the feature information, particular feature information to be compared with a plurality of reference feature information; and determine a machining section of the machine in the feature information, based on the plurality of reference feature information and the particular feature information.

10 Claims, 8 Drawing Sheets

(51) Int. Cl.
  *G05B 19/4063* (2006.01)
  *G05B 19/408* (2006.01)
(52) U.S. Cl.
  CPC .............. *G05B 2219/50276* (2013.01); *G05B 2219/50308* (2013.01)

(56) References Cited

U.S. PATENT DOCUMENTS

| | | |
|---|---|---|
| 2005/0078967 A1 | 4/2005 | Fujimoto et al. |
| 2005/0246604 A1 | 11/2005 | Fujimoto et al. |
| 2009/0145273 A1* | 6/2009 | Bressler .................. B26D 5/20 83/552 |
| 2009/0300679 A1 | 12/2009 | Hiroi et al. |
| 2012/0053850 A1 | 3/2012 | Yasukawa |
| 2016/0232476 A1 | 8/2016 | Nakata et al. |
| 2018/0335770 A1 | 11/2018 | Uemura |
| 2019/0294144 A1* | 9/2019 | Takahara ............ G05B 23/0221 |
| 2019/0324428 A1* | 10/2019 | Sakai .................. G05B 19/188 |
| 2020/0133230 A1 | 4/2020 | Goto et al. |

FOREIGN PATENT DOCUMENTS

| | | | | |
|---|---|---|---|---|
| CN | 203799218 U | | 8/2014 | |
| CN | 105706123 A | | 6/2016 | |
| CN | 108899892 A | | 11/2018 | |
| CN | 108931967 A | | 12/2018 | |
| JP | 2018-156652 | | 10/2018 | |
| JP | 2018-156652 A | * | 10/2018 | ........... G05B 19/406 |
| JP | 2019-159759 A | * | 9/2019 | .............. E02F 9/264 |
| JP | 2019160067 A | * | 9/2019 | ......... G05B 19/4065 |
| JP | 2020154520 A | * | 9/2020 | ........... G05B 19/406 |
| WO | WO-2018119845 A1 | * | 7/2018 | ........... G05B 19/406 |
| WO | WO-2018169069 A1 | * | 9/2018 | ......... G05B 19/4065 |
| WO | WO-2019/176699 A1 | | 9/2019 | |

OTHER PUBLICATIONS

Chinese Office Action dated May 18, 2023 issued in corresponding Chinese Appln. No. CN202111402566.3.

* cited by examiner

DETERMINATION APPARATUS, DETERMINATION SYSTEM, DETERMINATION METHOD, AND RECORDING MEDIUM

CROSS-REFERENCE TO RELATED APPLICATION

This patent application is based on and claims priority pursuant to 35 U.S.C. § 119(a) to Japanese Patent Application No. 2020-199131, filed on Nov. 30, 2020, in the Japan Patent Office, the entire disclosure of which is hereby incorporated by reference herein.

BACKGROUND

Technical Field

Embodiments of the present disclosure relate to a determination apparatus, a determination system, a determination method, and a recording medium.

Related Art

There has been developed a system for determining an abnormality in machining by a machine tool by using context information and vibration data of the machine tool during the machining. The context information is called a cutting feed signal and is acquired from a numerical control (NC) device. For example, there has been developed a system for estimating an abnormality in machining by, for example, a tool such as a drill, an end mill, or a face mill of a machine tool. The related art system determines a machining section in a cutting feed signal, and estimates an abnormality in machining by the machine tool based on a change in vibration data in the determined machining section

SUMMARY

An embodiment of the present disclosure provides a determination apparatus that includes circuitry. The circuitry receives operation information, corresponding to an action being performed by a machine to be diagnosed, and a detection signal of a physical quantity that changes according to the action of the machine. The circuitry take outs, from the detection signal, an operation detection signal indicating that the machine is operating, based on the operation information. The circuitry extracts feature information of the operation detection signal; select, from the feature information, particular feature information to be compared with a plurality of reference feature information. The circuitry determines a machining section of the machine in the feature information, based on the plurality of reference feature information and the particular feature information.

Another embodiment provides a determining method that includes receiving operation information corresponding to an action being performed by a machine to be diagnosed and a detection signal of a physical quantity that changes according to the action of the machine; taking out, from the detection signal, an operation detection signal indicating that the machine is operating, based on the operation information; extracting feature information of the operation detection signal; selecting, from the feature information, particular feature information to be compared with a plurality of reference feature information; and determining a machining section of the machine in the feature information, based on the plurality of reference feature information and the particular feature information.

Another embodiment provides a non-transitory recording medium storing a plurality of program codes which, when executed by one or more processors, causes the processors to perform the method described above.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Descriptions are given below in detail of a diagnostic apparatus (an example of a determination apparatus), a diagnostic system (an example of a determination system), a determination method, a recording medium storing program codes for the method according embodiments of the present disclosure, with reference to the drawings.

A description is given of a first embodiment of the present disclosure.

Figure 1:
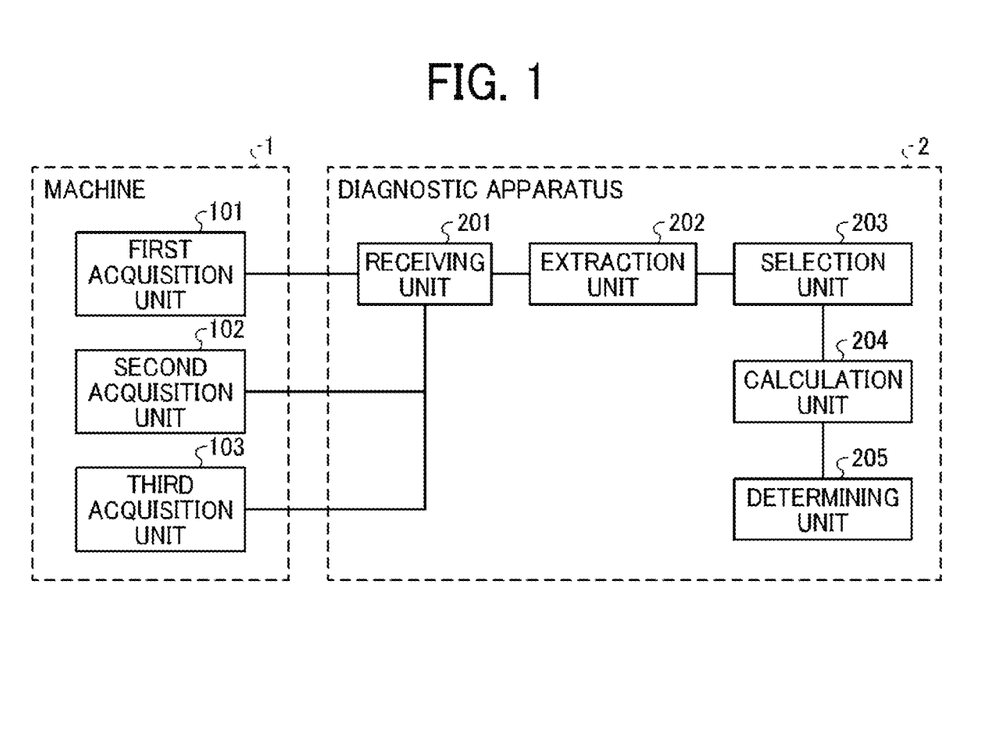
FIG. 1 is a block diagram illustrating an example of a configuration of a diagnostic system according to a first embodiment of the present disclosure.

FIG. 1 is a block diagram illustrating an example of a configuration of a diagnostic system according to a first embodiment of the present disclosure. As illustrated in FIG. 1, the diagnostic system according to the present embodiment includes a machine 1 and a diagnostic apparatus 2.

The machine 1 is a machine tool such as a machining center, a drilling machine, or a milling machine that performs machining action such as cutting, grinding, or polishing on a subject (e.g., workpiece) using a tool. The machine 1 is an example of a machine to be diagnosed (subject of diagnosis). The machining action is an example of an action.

In the present embodiment, as illustrated in FIG. 1, the machine 1 includes a first acquisition unit 101, a second acquisition unit 102, and a third acquisition unit 103.

The first acquisition unit 101 acquires operation information (for example, context information such as a cutting feed signal and a ladder signal) corresponding to an action being performed by the machine 1. The first acquisition unit 101 and the third acquisition unit 103 are implemented by, for example, a set of circuits to convert signals. The context information is information determined for each type of action of the machine 1. For example, the context information includes information identifying the machine 1, information identifying a driver of the machine 1 (for example, identification information of a tool), configuration information such as a diameter of the tool driven by the driver and a material of the tool, and information indicating machining conditions such as an operation state of the tool driven by the driver, cumulative use time from start of use of the driver, load related to the driver, rotation speed of the driver, and machining speed of the driver. The first acquisition unit 101 transmits the acquired operation information to the diagnostic apparatus 2.

The second acquisition unit 102 is a device such as a sensor that replaces a natural phenomenon of the machine 1 with an electric signal and outputs the electric signal. In other words, the second acquisition unit 102 acquires a detection signal of a physical quantity that changes according to the operation of the machine 1. Then, the second acquisition unit 102 transmits the acquired detection signal to the diagnostic apparatus 2.

For example, die second acquisition unit 102 detects, as a physical quantity, vibration or sound waves caused by contact between a tool (for example, a drill, a milling tool, a cutting tool tip, or a grindstone) attached to the machine 1 and a subject of machining during machining (e.g., polishing), or vibration or sound waves generated by the tool or the machine 1. The second acquisition unit 102 outputs a detection signal (sensor data) indicating the detection result to the diagnostic apparatus 2. That is, the second acquisition unit 102 is implemented by, for example, a microphone, a vibration sensor, an accelerometer, a displacement meter, an acoustic emission (AE) sensor, or the like. The second acquisition unit 102 is disposed in the vicinity of a position where the tool as the vibration source contacts the subject of machining (workpiece). For example, the second acquisition unit 102 is disposed near the spindle of the tool, or near a jig that secures the tool.

The third acquisition unit 103 acquires an output signal output from the machine 1 in a predetermined operating state. The predetermined operating state is a state of the machine 1 performing an action, such as tapping, prescribed by, for example, a machining program. Then, the third acquisition unit 103 transmits the acquired output signal to the diagnostic apparatus 2.

The diagnostic apparatus 2 (an example of an information processing apparatus) is a computer mainly intended for industrial use and consumer use. The diagnostic apparatus 2 determines whether the machine 1 is in a machining section (whether the machine 1 is performing machining) based on various information (such as operation information, detection signals, and output signal) acquired from the machine 1.

In the present embodiment, the diagnostic apparatus 2 includes a receiving unit 201, an extraction unit 202, a selection unit 203, a calculation unit 204, and a determining unit 205.

The receiving unit 201 receives various information such as the operation information, the detection signals, and the output signals from the machine 1. Further, in one embodiment, the receiving unit 201 functions as a taking-out unit that takes out, from detection signals, an operation detection signal indicating that the machine 1 is operating, based on the operation information.

In addition, when the following conditions (1) and (2) are satisfied, the receiving unit 201 executes a process of combining the operation information acquired in the process of an outward movement of the machine 1 and the operation information acquired in the process of a return movement of the machine 1. (1) The machine 1 is in the predetermined operating state (in other words, an output signal is being received by the receiving unit 201). (2) A time from the stop of acquisition of the operation information of the outward movement of the machine 1 to the start of acquisition of the operation information of the return movement of the machine 1 (that is, a stop section of the machine 1) is equal to or shorter than a threshold time. The threshold time is set in advance. The receiving unit 201 extracts the operation detection signal from the detection signal based on the combined operation information.

In the present embodiment, the receiving unit 201 determines whether or not the machine 1 is in the predetermined operating state using the output signal from the machine 1. However, the present disclosure is not limited thereto. Alternatively, the receiving unit 201 may determine whether or not the machine 1 is in the predetermined operating state using operation information (e.g., the value of current flowing through the machine 1, the rotation speed of the spindle of the tool of the machine 1, or the rotation direction of the spindle).

The extraction unit 202 extracts feature information of the operation detection signal extracted by the receiving unit 201. In the present embodiment, the extraction unit 202 extracts a numerical feature value of the operation detection signal extracted by the receiving unit 201 as the feature information of the operation detection signal. For example, the extraction unit 202 extracts a numerical feature value of the operation detection signal by fast Fourier transform (FFT), wavelet transform, zero-crossing, or frequency or interval of exceeding a threshold value.

The selection unit 203 generates a plurality of reference feature information serving as references, based on the feature information extracted by the extraction unit 202. The feature information is, for example, a feature value of vibration data of the machine 1 calculated by FFT or the like. The reference feature information is, for example, a feature value of vibration data in the machining section of the machine 1 calculated using machine learning or the like. Next, the selection unit 203 selects, from the feature information, feature information (hereinafter, referred to as particular feature information) to be compared with the plurality of reference feature information. Accordingly, even when the machine 1 performs machining, such as tap machining, that involves a complicated action, the diagnostic apparatus 2 determines (estimates) a machining section during which the machine 1 performs machining with high accuracy. The particular feature information is, for example, feature information for determining whether or not the machine 1 is in a machining section, among the feature information.

In the present embodiment, the selection unit 203 generates, by machine learning or the like, a plurality of models (an example of the plurality of reference feature information) based on the feature information extracted by the extraction unit 202. Specifically, based on one model, the selection unit 203 generates another model. For example, the selection unit 203 generates a first model for determining stop and rotation of the spindle of the machine 1 based on the intensity of the operation detection signal. Next, the selection unit 203 excludes the feature information of the section in which the spindle stays motionless by the first model. Then, the selection unit 203 generates a second model for determining the feature information of the machining section and the feature information of the non-machining section by using one-class support vector machine (SVM), based on the excluded feature information. The machining section is an example of a section (processing period) in which the machine 1 performs machining (an example of processing). The non-machining section is an example of a section (non-processing period) in which the machine 1 does not perform machining (or processing).

In the present embodiment, the selection unit 203 generates a model by machine learning. However, the present disclosure is not limited thereto as long as the selection unit 203 generates a model for determining a machining section and a non-machining section. For example, the selection unit 203 may generate a model by a statistical outlier detection method. Alternatively, the selection unit 203 may generate a model using a threshold value when the strength of the detection signal in each of the machining section and the non-machining section is preset.

In the present embodiment, the selection unit 203 generates the first model for excluding the feature information of the section in which the spindle of the machine 1 stays motionless and the second model for determining the feature information of the non-machining section, but the present disclosure is not limited thereto. For example, when the spindle of the machine 1 performs a complicated action, the selection unit 203 may generate three or more models.

In the present embodiment, the selection unit 203 generates the second model using the first model. However, the present disclosure is not limited thereto, and the selection unit 203 may generate a plurality of independent models. For example, assume that a section in which the spindle of the machine 1 is accelerated to be in a stationary state (for example, a section from 100 ms from the start of output of the cutting feed signal to the 200 ms) is set in advance. In such a case, it is also possible to generate a new model by the logical conjunction of a model generated based on feature information of such a section from (e.g., 100 ms 200 ms) and the first model described above, so as to generate a model similar to the second model.

The calculation unit 204 calculates likelihood of the machining section of the machine 1 based on the plurality of models generated by the selection unit 203 and the particular feature information selected by the selection unit 203. The likelihood of the machining section (an example of likelihood of a processing section) is likelihood of a section during which the machine 1 performs the machining set in advance. In other words, the likelihood of the machining section may be a degree to which the particular feature information does not resemble a pattern of the detection signal used to generate the model. For example, the likelihood of the machining section may be a value obtained by calculating the Euclidean distance between the model and the particular feature information. The closer the likelihood of the machining section is to "1," the higher the likelihood of the machining section is. Since the likelihood of the machining section is calculated from the particular feature information extracted from the operation detection signal, the likelihood of the machining section is a value including variation. In the present embodiment, the calculation unit 204 calculates the likelihood of the machining section of the machine 1 for each model. Alternatively, in the present embodiment, the calculation unit 204 may calculate the likelihood of the machining section for each combination of a plurality of models. For example, the calculation unit 204 may assign a weight to the likelihood of the machining section calculated for each model, calculates the sum of the weighted likelihood values, and use the sum as the final calculation result of the likelihood of the machining section.

The determining unit 205 determines the machining section of the machine 1 based on the likelihood of the machining section. In the present embodiment, the likelihood of the machining section is calculated for each model. Accordingly, the determining unit 205 may determine the machining section of the machine 1 for each model, and may use the logical conjunction of the determination results of the plurality of machining sections as the final determination result of the machining section. Alternatively, the determining unit 205 may assign a weight to the determination result of the machining section of each model and determine the machining section based on the weighted machining section determination results of the models.

Figure 2:
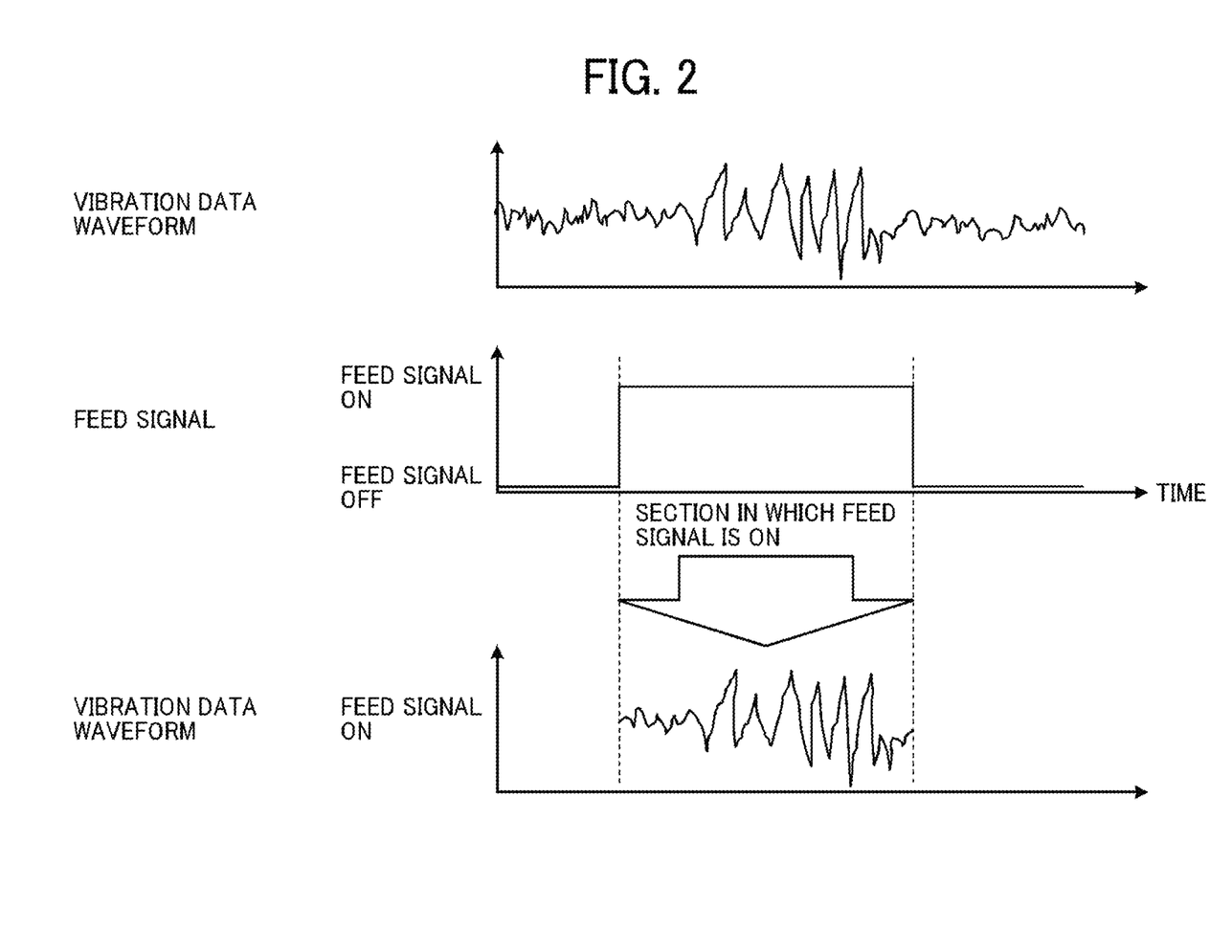
FIG. 2 is a chart illustrating an example of machining section determination processing by a comparative diagnostic apparatus.

Next, a description is given of an example of determination of the machining section by the diagnostic apparatus 2 according to the present embodiment, with reference to FIGS. 2 to 7. FIG. 2 is a chart illustrating an example of machining section determination processing by a comparative diagnostic apparatus.

As illustrated in FIG. 2, the comparative diagnostic apparatus compares vibration data (an example of a detection signal) of the machine 1 with a feed signal (an example of operation information) of the machine 1, and extracts a portion of the vibration data corresponding to a section in which the feed signal is output. Then, the comparative diagnostic apparatus extracts feature information from the extracted vibration data. Next, based on the extracted feature information, the comparative diagnostic apparatus generates a reference for determining the machining section and the non-machining section of the machine 1, compares the generated reference with the vibration data, and calculates the likelihood of the machining section of the machine 1. Thereafter, the comparative diagnostic apparatus determines, as a machining section, a section in which the likelihood of the machining section exceeds a threshold, and determines, as a non-machining section, a section in which the likelihood of the machining section is equal to or lower than the threshold.

Figure 3:
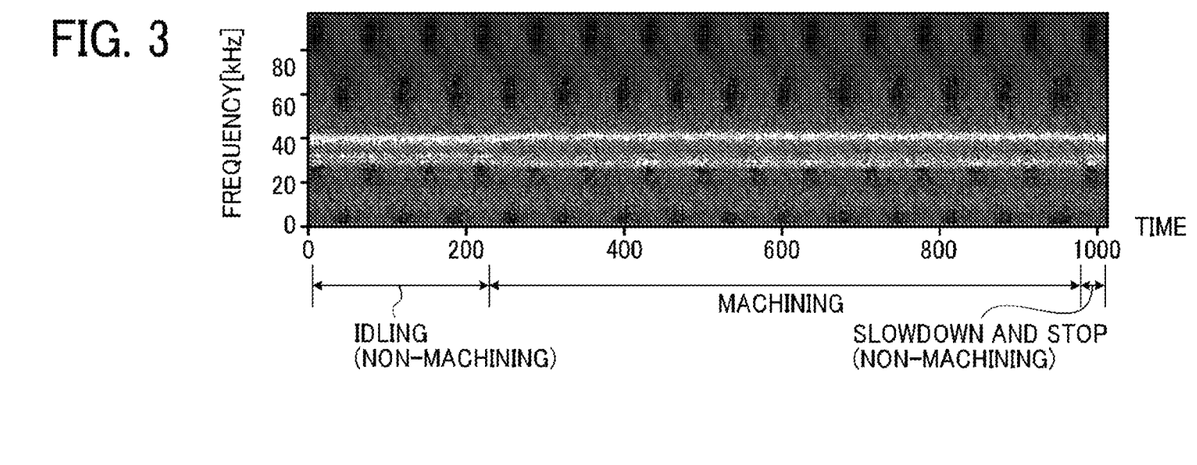
FIG. 3 is a chart illustrating an example of a spectrogram of vibration data in a section in which a feed signal is on in vibration data of a drill of a machine tool.

FIG. 3 is a chart illustrating an example of a spectrogram of vibration data in a section in which a feed signal is on in vibration data of a drill of a machine tool. In FIG. 3, the vertical axis represents the frequency (kHz) of the vibration data, and the horizontal axis represents time (ms). Spectrograms express the intensity of vibration in a gradation from blue to green, to yellow, and to red. In FIG. 3, the intensity of a signal (vibration data) is represented by blue color shading. For example, dark blue indicates that the signal is weaker, and the signal is stronger as the color is close to red.

As illustrated in FIG. 3, the feed signal of the machine 1 has two types of patterns. Therefore, the comparative diagnostic apparatus generates a reference for determining a machining section and a non-machining section (idling, slowdown, and stop) of the machine 1 based on a signal at several milliseconds after turning-on of the feed signal, determines a section of vibration data similar to the generated reference as a non-machining section, and determines a section of vibration data not similar to the generated reference as a machining section.

Figure 4:
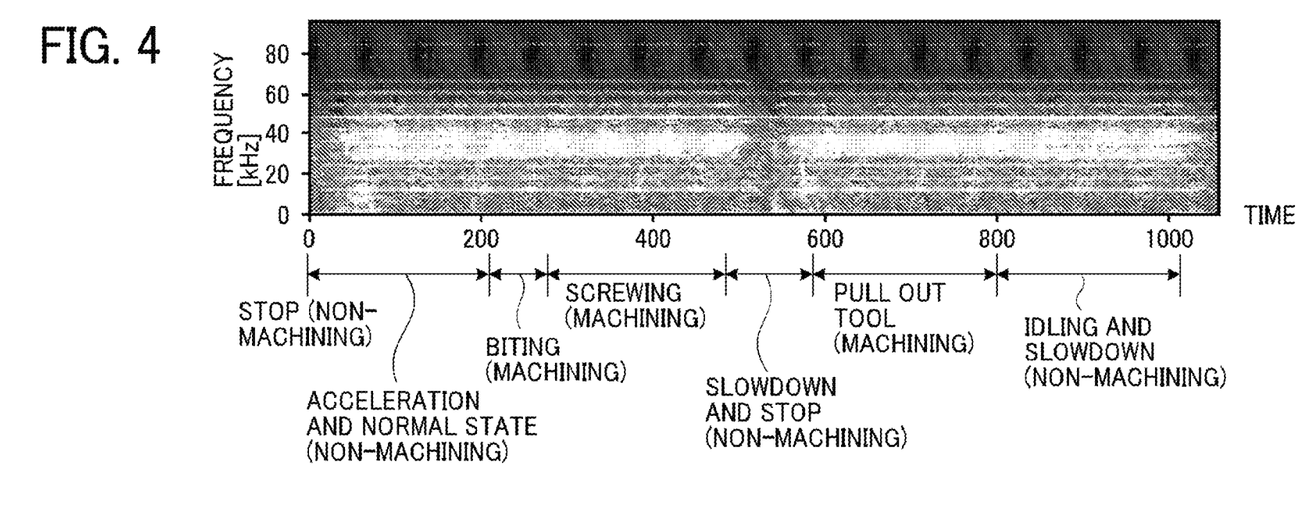
FIG. 4 is a chart illustrating an example of a spectrogram of vibration data in a section in which a feed signal is on in vibration data of a drill of a machine tool that perform tapping.
Figure 5:
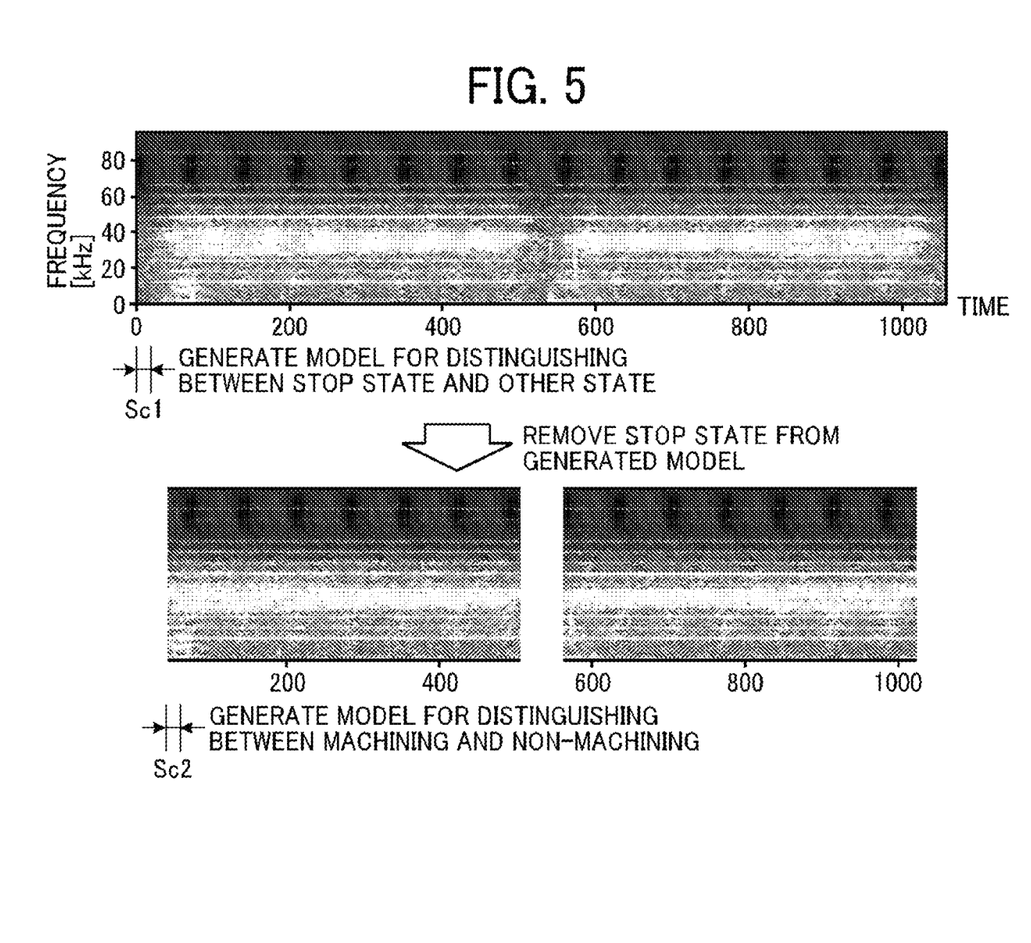
FIG. 5 is another chart illustrating an example of a spectrogram of vibration data in a section in which a feed signal is on in vibration data of a drill of a machine tool that perform tapping.

FIGS. 4 and 5 are charts illustrating an example of a spectrogram of vibration data in a section in which a feed signal is on in vibration data of a drill of a machine tool that perform tapping. In FIGS. 4 and 5, the vertical axis represents the frequency (kHz) of the vibration data, and the horizontal axis represents time (ms). In FIGS. 4 and 5, similar to FIG. 3, the intensity of the signal (vibration data) is represented by blue scale shading. For example, dark blue indicates that the signal is weaker, and the signal is stronger as the color is close to red. FIGS. 4 and 5 illustrate an example of a spectrogram of vibration data obtained by combining vibration data of an outward movement and a return movement of the drill of the machine tool that performs tapping.

As illustrated in FIG. 4, in the machine 1, at the start time point when the feed signal is turned on, the spindle of the tool (drill) is stopped and gradually accelerated, and the tool bites a workpiece to form a screw thread. Thereafter, the machine 1 reversely rotates the spindle (main shaft) to pull out the tool. In this way, the state of the machine 1 changes to a plurality of states (e.g., acceleration, biting, screwing, slowdown, tool pulling out, and idling) in the period during which the feed signal is on. Therefore, since the vibration data of the tool of the machine 1 also changes into a plurality of patterns, it is difficult to classify the patterns of the vibration data in two.

In view of the foregoing, according to the present embodiment, the diagnostic apparatus 2 generates a plurality of models, calculates the likelihood of the machining section of the machine 1 based on the plurality of models, and determines the machining section of the machine 1 based on the likelihood of the machining section. The diagnostic apparatus 2 generates a model using a section Sc1 in FIG. 5, to distinguish the stop state and states other than the stop state, and generates a model using a section Sc2 to distinguish the machining state and the non-machining state (states other than machining state). Thus, as illustrated in FIG. 5, the diagnostic apparatus 2 extracts, from the vibration data of the section in which the feed signal is on, the vibration data of a section in which the tool is in the stopped state. Accordingly, the pattern of the vibration data are classified (determined) into two of the machining section and the non-machining section of the machine 1.

Figure 6A:
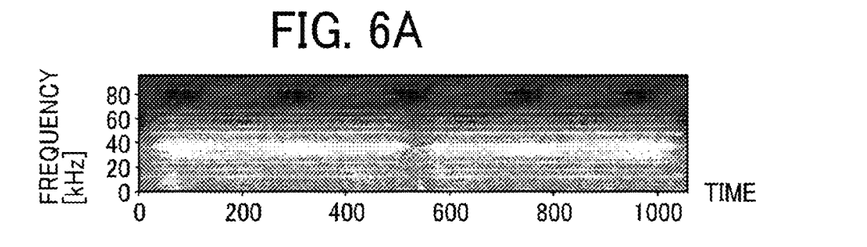
FIGS. 6A, 6B, and 6C are charts illustrating an example of machining section determination process by the diagnostic apparatus according to the first embodiment.
Figure 6B:
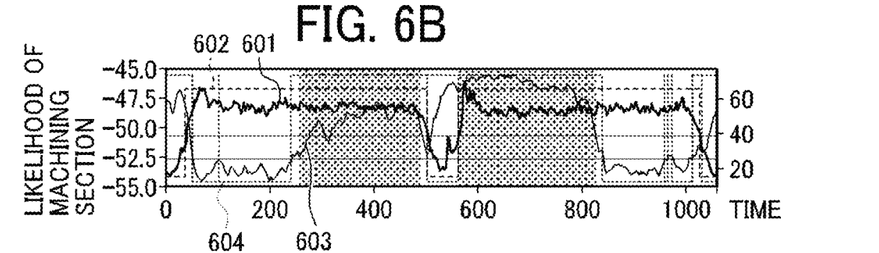
Figure 6C:
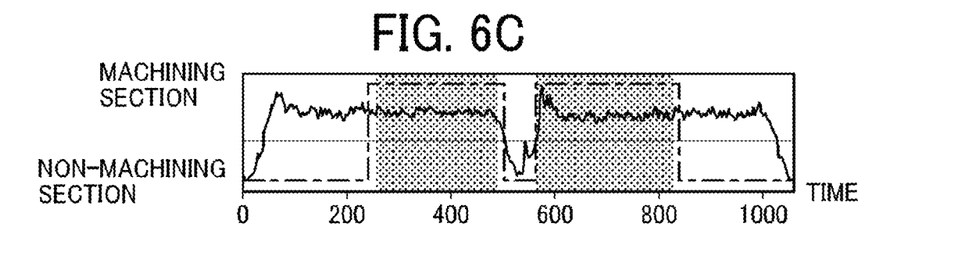

FIGS. 6A, 6B, and 6C are charts illustrating an example of a machining section determination process by the diagnostic apparatus according to the first embodiment. FIG. 6A is a chart illustrating an example of a spectrogram of vibration data in a section in which a feed signal is on in vibration data of a drill of a machine tool. In FIG. 6A, the vertical axis represents the frequency (kHz) of the vibration data, and the horizontal axis represents time (ms). FIG. 6B is a chart illustrating an example of a calculation result of the likelihood of the machining section of the machine tool. In FIG. 6B, the vertical axis represents the calculation result of the likelihood of the machining section for each model, and the horizontal axis represents time (ms). FIG. 6C is a chart illustrating an example of a determination result of the machining section of the machine tool. In FIG. 6C, the vertical axis represents the determination result of the machining section, and the horizontal axis represents time (ms).

In the present embodiment, the selection unit 203 generates a plurality of models (for example, first and second models) as described above. Then, as illustrated in FIG. 6B, the calculation unit 204 calculates a machining section likelihood 601 of the vibration data by the first model and a machining section likelihood 603 of the vibration data by the second model. Next, as illustrated in FIG. 6B, the determining unit 205 determines a section in which the machining section likelihood 601 of the first model exceeds a threshold value as a machining section 602 (indicated by a broken line) in which the spindle of the tool of the machine 1 is operating. That is, as illustrated in FIG. 6B, the determining unit 205 excludes the vibration data of the stop section from the vibration data. Next, as illustrated in FIG. 6B, the determining unit 203 determines, in the machining section 602, a section in which the machining section likelihood 603 of the vibration data calculated by the second model exceeds a threshold value as a machining section 604 (indicated by a dotted line) in which the spindle of the tool of the machine 1 is operating. That is, as illustrated in FIG. 6C, the determining unit 203 determines the logical conjunction of the machining section 602 determined using the first model and the section determined as the machining section 604 determined using the second model, as the machining section (indicated by the broken line) of the machine 1 of final result.

Figure 7:
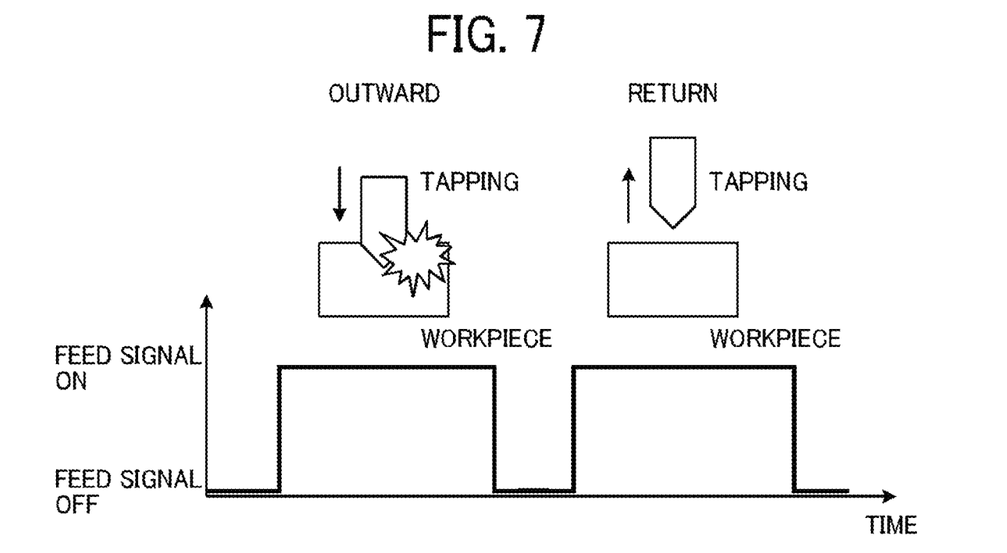
FIG. 7 is a diagram illustrating an example of an operation information combining process performed by the diagnostic apparatus according to the first embodiment.

FIG. 7 is a diagram illustrating an example of an operation information combining process performed by the diagnostic apparatus according to the first embodiment. As illustrated in FIG. 7, tapping performed by the machine 1 includes two processes of an outward movement in which a tool bites into a workpiece to form a screw thread and a return movement in which the tool biting into the workpiece is pulled out from the workpiece (subject of machining). In the two processes, separate feed signals (operation information) are output to the machine 1.

However, when the interval between the outward movement and the return movement (for example, the stop section of 400 ms to 600 ms in FIGS. 6B and 6C) is shorter than a sampling period, the following phenomena may occur depending on the time at which the feed signal is sampled. The outward movement feed signal and the return movement feed signal may be randomly combined or divided from each other. Such phenomena may make it difficult for the diagnostic apparatus 2 to check the history of machining by the machine 1. Alternatively, it may be difficult to analyze machining by the machine 1 because the machining section varies depending on whether or not the outward feed signal is combined with the return feed signal. Specifically, tap machining includes an outward movement in which a tool bites into a workpiece to form a screw thread and a return movement in which the tool is pulled out the workpiece. Thus, a feed signal is generated for each of the outward movement and the return movement. However, when the interval between the outward movement and the return movement (for example, the stop section of 400 ms to 600 ms in FIGS. 6B and 6C) is shorter than the sampling period, the outward movement feed signal and the return movement feed signal may be randomly combined or divided from each other, which makes it difficult to determine the machining section of the machine 1.

Therefore, in the present embodiment, as described above, in a case where the following conditions (1) and (2) are satisfied, the diagnostic apparatus 2 performs a process of combining the operation information acquired in an outward movement of the machine 1 with the operation information acquired in a return movement of the machine 1. (1) The machine 1 is in a predetermined operating state (for example, the machine 1 is performing tapping). (2) The stop section of the machine 1 (a section in which the feed signal illustrated in FIG. 7 is off) is equal to or shorter than a threshold time. The process mentioned here is a process of combining the operation information acquired from the start to the end of each of the outward movement and the return movement of the machine 1, or combining the operation information acquired (acquired) respectively in the machining section of the outward movement and the machining section of the return movement of the machine 1. Thus, since the machining section is determined by using the operation information of the same section, the abnormality of the machine 1 is accurately determined.

Therefore, in the case where an interval between an outward feed signal and a return feed signal for tapping or the like of the machine 1 is shorter than the sampling period, random occurrences of combining the outward movement feed signal with the return movement feed signal and dividing the outward movement feed signal and the return movement feed signal are prevented. Accordingly, this configuration prevents the above-described inconvenience for the diagnostic apparatus 2 in checking the history of machining by the machine 1 and the inconvenience in analyzing machining by the machine 1 caused by variations in the machining section depending on whether or not the outward feed signal is combined with the return feed signal.

Figure 8:
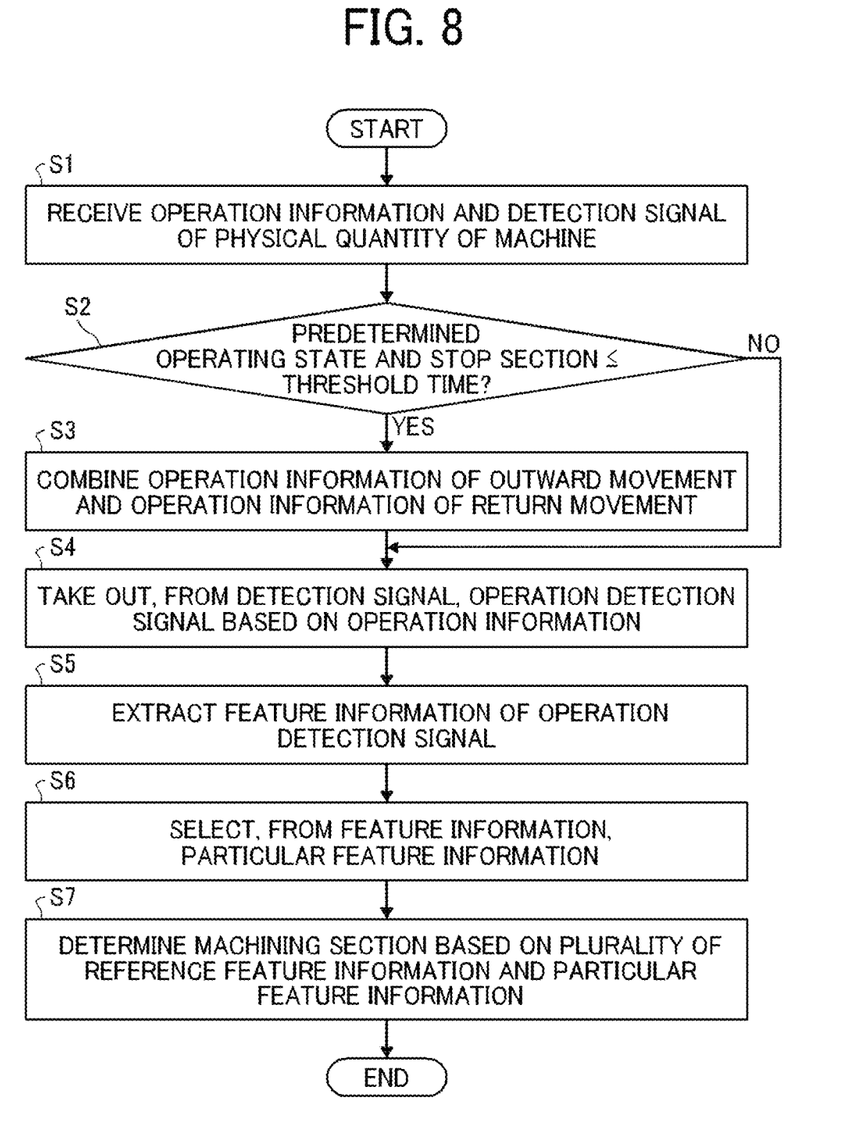
FIG. 8 is a flowchart illustrating an example of machining section determination according to the first embodiment.

As described above, according to the present embodiment, even when the machine 1 performs machining involving a complicated action such as tapping, the diagnostic system determines (estimates) the machining section in which the machine 1 is performing machining with high accuracy. FIG. 8 is a flowchart illustrating an example of machining section determination performed by the diagnostic apparatus according to the first embodiment. The receiving unit 201 receives various information such as operation information, detection signals, and output signals from the machine 1 (S1). In response to determining that the above-described conditions (1) and (2) are satisfied (Yes in S2), the receiving unit 201 executes the process of combining the operation information acquired in the process of an outward movement and the operation information acquired in the process of a return movement of the machine 1 (S3). In response to determining that the above-described conditions (1) and (2) are not satisfied (No in S2), the process proceeds to S4 without performing the combining process. The receiving unit 201 extracts, from the detection signal, an operation detection signal indicating that the machine 1 is operating, based on the operation information (S4). In the present embodiment, the extraction unit 202 extracts a numerical feature value of the operation detection signal extracted by the receiving unit 201 as the feature information of the operation detection signal (S5). The selection unit 203 selects, from the feature information, particular feature information to be compared with the plurality of reference feature information (S6). The determining unit 205 determines the machining section of the machine 1 based on the likelihood of the machining section (S7).

Modification

This modification is an example of process of determining a machining section of a machine tool when the machine tool performs tap machining. In the following, a description of the same configuration as that of the above-described embodiment will be omitted.

Figure 9:
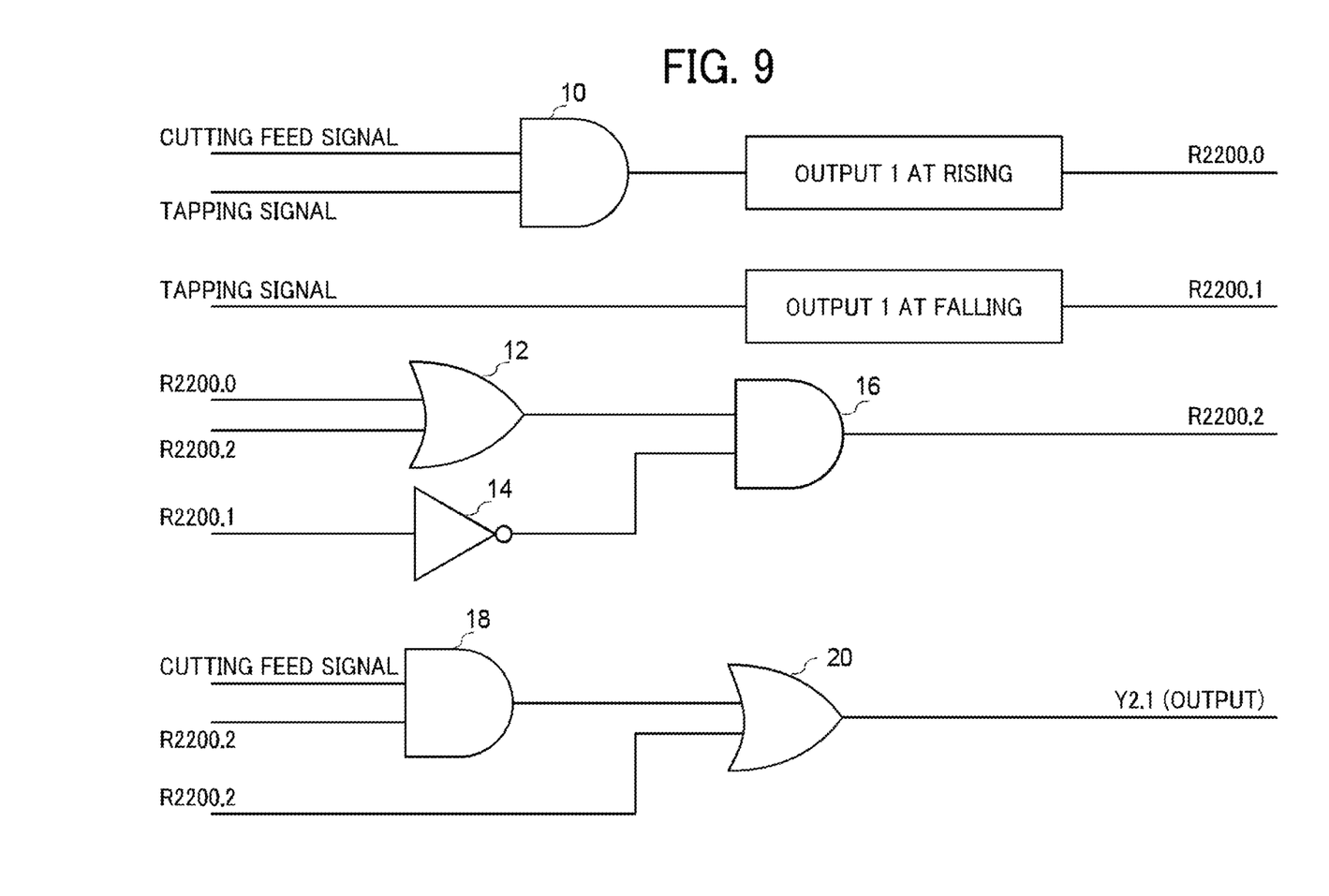
FIG. 9 is a diagram illustrating an example of a logic circuit of the determining unit of the diagnostic apparatus according to a modification of the first embodiment and FIG. 10 is a diagram illustrating an example of machining section determination performed by the diagnostic apparatus according to the modification.

FIG. 9 is a diagram illustrating an example of a logic circuit of the determining unit of the diagnostic apparatus according to the present modification. The logic circuit of FIG. 9 includes AND circuits 10, 16, and 18; OR circuits 12 and 20; and a NOT circuit 14. The logic circuit of FIG. 9 includes AND circuits 10, 16, and 18; OR circuits 12 and 20; and a NOT circuit 14. From the cutting feed signal and the tapping signal, the AND circuit 10 output a signal R2200.0 indicating "1" at rising. From the tapping signal, a signal R2200.1 is output at falling. From the signals R2200.0, R2200.1, and R2200.2, the OR circuits 12, the NOT circuit 14, and the AND circuit 16 output the signal R2200.2. From the cutting feed signal and the signal R2200.2, the AND circuit 18 and the OR circuit 20 output a signal Y2.1.

Figure 10:
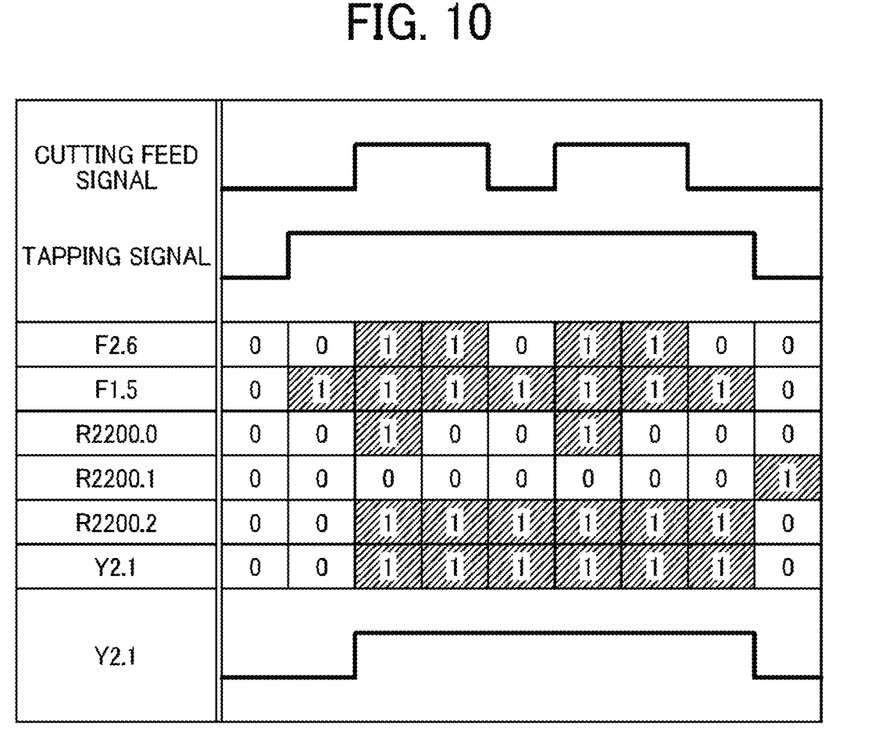

FIG. 10 is a diagram illustrating an example of machining section determination performed by the diagnostic apparatus according to the present modification. Signal in FIG. 10 includes an operation signal F2.6 of the spindle of the machine 1 and a tapping operation signal F1.5. When the machine 1 performs tap machining, as illustrated in FIG. 10, the third acquisition unit 103 of the machine 1 acquires a tapping signal (an example of an output signal) output from the machine 1 performing tap machining, and transmits the acquired tapping signal to the diagnostic apparatus 2. Additionally, when the machine 1 performs tap machining, as illustrated in FIG. 9, the first acquisition unit 101 of the machine 1 acquires a cutting feed signal (an example of operation information) and transmits the acquired cutting feed signal to the diagnostic apparatus 2.

Using the logic circuit illustrated in FIG. 9, the determining unit 205 of the diagnostic apparatus 2 performs a logical operation using the tapping signal and the cutting feed signal received with the receiving unit 201, thereby determining a section signal (a section in which the signal Y2.1 is at a high level) indicating a machining section (from an outward movement to a return movement) in which the machine 1 actually performs tap machining, as illustrated in FIG. 10. The determining unit 205 determines the machining section from the outward movement to the return movement in the tap machining of the machine 1 based on the section signal (Y2.1) and the vibration data.

Note that the computer programs performed in the diagnostic apparatus 2 according to the above-described embodiments may be preliminarily installed in a memory such as a read only memory (ROM). The above-described threshold time, the threshold value, and the like are stored in, for example, the ROM. The program executed by the diagnostic apparatus 2 according to the above-described embodiments may be stored in a computer-readable recording medium, such as a compact disc read-only memory (CD-ROM), a flexible disk (FD), a compact disc recordable (CD-R), and a digital versatile disk (DVD), in an installable or executable file format, to be provided.

Alternatively, the computer programs executed in the diagnostic apparatus 2 according the above-described embodiments can be stored in a computer connected to a network such as the Internet and downloaded through the network. Alternatively, the computer programs executed in the diagnostic apparatus 2 according to the above-described embodiment can be provided or distributed via a network such as the Internet.

The program executed by the diagnostic apparatus 2 according to the above-described embodiment has a modular structure including the above-described receiving unit 201, the extraction unit 202, the selection unit 203, the calculation unit 204, and the determining unit 205. As hardware, as the CPU (an example of a processor) reads the program from the ROM and executes the program, the receiving unit 201, the extraction unit 202, the selection unit 203, the calculation unit 204, and the determining unit 205 are loaded and implemented (generated) in a main memory. The receiving unit 201 is implemented by the CPU executing the program, a network interface circuit, a signal convertor, and the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A determination apparatus comprising circuitry configured to:
   receive operation information corresponding to an action being performed by a machine to be diagnosed and a detection signal of a physical quantity that changes according to the action of the machine;
   take out, from the detection signal, an operation detection signal indicating that the machine is operating, based on the operation information;
   extract feature information of the operation detection signal;
   select, from the feature information, particular feature information to be compared with a plurality of reference feature information; and
   determine a machining section of the machine in the feature information, based on the plurality of reference feature information and the particular feature information, wherein the machine is configured to perform an action including an outward movement and a return movement, and
   wherein the circuitry is configured to perform a process of combining the operation information acquired in the outward movement with the operation information acquired in the return movement based on a determination that (a) a time from a stop of acquisition of the operation information of the outward movement to a start of acquisition of the operation information of the return movement is equal to or shorter than a threshold time and (b) the machine is in a predetermined operating state.

2. The determination apparatus according to claim 1,
   wherein the circuitry is configured to generate the plurality of reference feature information based on the feature information.

3. The determination apparatus according to claim 2,
   wherein the circuitry is configured to generate, based on one of the plurality of reference feature information, another of the plurality of reference feature information.

4. The determination apparatus according to claim 1,
   wherein the circuitry is configured to:
   calculate likelihood of the machining section of the machine based on the plurality of reference feature information and the particular feature information, and
   determine the machining section based on the likelihood of the machining section.

5. The determination apparatus according to claim 4,
   wherein the circuitry is configured to calculate the likelihood of the machining section for each combination of the plurality of reference feature information.

6. The determination apparatus according to claim 4,
   wherein the circuitry is configured to calculate the likelihood of the machining section for each of the plurality of the reference feature information.

7. The determination apparatus according to claim 1,
   wherein the process of combining is:
   a process of combining the operation information acquired from a start to an end of the outward movement with the operation information acquired from a start to an end of the return movement; or
   a process of combining the operation information acquired in a section corresponding to the outward movement with the section corresponding to the operation information acquired in the return movement.

8. A determination system comprising:
   a sensor configured to acquire the detection signal of the physical quantity that changes according to the action performed by the machine; and
   the determination apparatus according to claim 1.

9. A determination method comprising:
   receiving operation information corresponding to an action being performed by a machine to be diagnosed and a detection signal of a physical quantity that changes according to the action of the machine, wherein the machine performs an action including an outward movement and a return movement;
   taking out, from the detection signal, an operation detection signal indicating that the machine is operating, based on the operation information;
   extracting feature information of the operation detection signal;
   selecting, from the feature information, particular feature information to be compared with a plurality of reference feature information; and
   determining a machining section of the machine in the feature information, based on the plurality of reference feature information and the particular feature information
   wherein circuitry is configured to perform a process of combining the operation information acquired in the outward movement with the operation information acquired in the return movement based on a determination that (a) a time from a stop of acquisition of the operation information of the outward movement to a start of acquisition of the operation information of the return movement is equal to or shorter than a threshold time and (b) the machine is in a predetermined operating state.

10. A non-transitory recording medium storing a plurality of program codes which, when executed by one or more processors, causes the processors to perform a method, the method comprising:

receiving operation information corresponding to an action being performed by a machine to be diagnosed and a detection signal of a physical quantity that changes according to the action of the machine, wherein the machine performs an action including an outward movement and a return movement;

taking out, from the detection signal, an operation detection signal indicating that the machine is operating, based on the operation information;

extracting feature information of the operation detection signal;

selecting, from the feature information, particular feature information to be compared with a plurality of reference feature information; and determining a machining section of the machine in the feature information, based on the plurality of reference feature information and the particular feature information, wherein circuitry is configured to perform a process of combining the operation information acquired in the outward movement with the operation information acquired in the return movement based on a determination that (a) a time from a stop of acquisition of the operation information of the outward movement to a start of acquisition of the operation information of the return movement is equal to or shorter than a threshold time and (b) the machine is in a predetermined operating state.

\* \* \* \* \*